(12) United States Patent
Kikuchi et al.

(10) Patent No.: US 12,503,209 B2
(45) Date of Patent: Dec. 23, 2025

(54) BUOYANCY ADJUSTER AND ORIENTATION ADJUSTMENT SYSTEM

(71) Applicants: Atsushi Kikuchi, Kanagawa (JP); Kazuhiro Koseki, Kanagawa (JP)

(72) Inventors: Atsushi Kikuchi, Kanagawa (JP); Kazuhiro Koseki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 464 days.

(21) Appl. No.: 18/092,944

(22) Filed: Jan. 4, 2023

(65) Prior Publication Data

US 2023/0219667 A1     Jul. 13, 2023

(30) Foreign Application Priority Data

Jan. 13, 2022  (JP) ................................ 2022-003693

(51) Int. Cl.
*B63G 8/14*     (2006.01)

(52) U.S. Cl.
CPC ...................... *B63G 8/14* (2013.01)

(58) Field of Classification Search
CPC ......... G03B 17/561; G03B 17/08; B63G 8/14
See application file for complete search history.

(56) References Cited

U.S. PATENT DOCUMENTS

| 4,721,055 A * | 1/1988 | Pado | B63G 8/001 |
| | | | 405/188 |
| 9,678,411 B1 * | 6/2017 | Harden | G03B 17/08 |
| 2015/0205187 A1 * | 7/2015 | Preciat Cervera | G03B 17/563 |
| | | | 348/375 |
| 2022/0128887 A1 * | 4/2022 | Koseki | G03B 17/08 |

FOREIGN PATENT DOCUMENTS

| JP | S61-501017 A | 5/1986 |
| JP | H02-216389 A | 8/1990 |
| JP | 5-158119 | 6/1993 |

(Continued)

OTHER PUBLICATIONS

Extended European Search Report issued May 19, 2023 in European Patent Application No. 23150092.7, 10 pages.

(Continued)

*Primary Examiner* — J. Todd Newton
(74) *Attorney, Agent, or Firm* — XSENSUS LLP

(57) ABSTRACT

A buoyancy adjuster includes: a buoyant portion detachably attached to a target object including a housing portion having a positive buoyancy, the buoyant portion having a neutral or negative buoyancy; and an orientation adjuster detachably attachable to the buoyant portion, the orientation adjuster configured to adjust orientation of the target object in a fluid. The orientation adjuster includes a weight portion detachably attached to a prescribed position of the buoyant portion, the weight portion having a negative buoyancy exceeding the positive buoyancy of the housing portion. A first height position of the housing portion relative to a second height position of the buoyant portion attaching the weight portion is lower than the first height position relative to the second height position of the buoyant portion without the weight portion in the fluid.

13 Claims, 10 Drawing Sheets

(56) References Cited

FOREIGN PATENT DOCUMENTS

| | | |
|---|---|---|
| JP | 6-028848 | 4/1994 |
| JP | H11-237688 A | 8/1999 |
| JP | 2004-125849 | 4/2004 |
| JP | 2007-328105 | 12/2007 |
| JP | 2017-026350 A | 2/2017 |
| JP | 3235072 U | 11/2021 |
| JP | 2022-071397 | 5/2022 |
| RU | 2 649 067 C1 | 3/2018 |

OTHER PUBLICATIONS

Office Action issued Jul. 11, 2025 in Japanese Patent Application No. 2022-003693, 13 pages.

* cited by examiner

BUOYANCY ADJUSTER AND ORIENTATION ADJUSTMENT SYSTEM

CROSS-REFERENCE TO RELATED APPLICATIONS

This patent application is based on and claims priority pursuant to 35 U.S.C. § 119(a) to Japanese Patent Application No. 2022-003693, filed on Jan. 13, 2022, in the Japan Patent Office, the entire disclosure of which is incorporated by reference herein.

BACKGROUND

Technical Field

The present disclosure relates to a buoyancy adjuster and an orientation adjustment system.

Related Art

An orientation adjustment apparatus is known that adjusts the orientation of an object to have its orientation adjusted in a fluid. The object includes a first portion that generates positive buoyant force and a second portion that generates neutral buoyancy or negative buoyant force. The positive buoyant force refers to upward buoyant force with an upward resultant force of buoyancy and gravity acting on the first portion in the fluid ("upward" is a direction in which the first portion floats), and the negative buoyant force refers to downward buoyant force with a downward resultant force of buoyancy and gravity acting on the second portion in the fluid ("downward" is a direction in which the second portion sinks). The neutral buoyancy refers to buoyancy with a zero resultant force of buoyancy and gravity acting on the second portion in the fluid.

SUMMARY

An embodiment of the present disclosure provides a buoyancy adjuster includes: a buoyant portion detachably attached to a target object including a housing portion having a positive buoyancy, the buoyant portion having a neutral or negative buoyancy; and an orientation adjuster detachably attachable to the buoyant portion, the orientation adjuster configured to adjust orientation of the target object in a fluid. The orientation adjuster includes a weight portion detachably attached to a prescribed position of the buoyant portion, the weight portion having a negative buoyancy exceeding the positive buoyancy of the housing portion. A first height position of the housing portion relative to a second height position of the buoyant portion attaching the weight portion is lower than the first height position relative to the second height position of the buoyant portion without the weight portion in the fluid.

Another embodiment of the present disclosure provides an orientation adjustment system including the above-described buoyancy adjuster and the target object detachably attached to the buoyancy adjuster.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
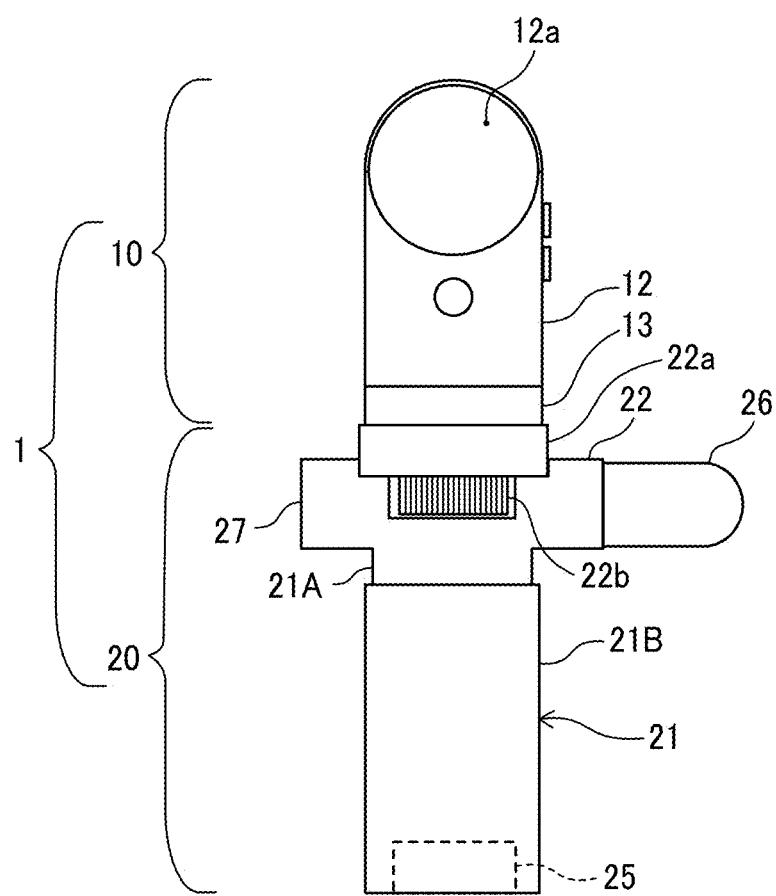
FIG. 1 is a front view of an underwater housing with a buoyancy adjuster attached onto a housing portion, according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Referring now to the drawings, embodiments of the present disclosure are described below. As used herein, the singular forms "a," "an," and "the" are intended to include the plural forms as well, unless the context clearly indicates otherwise.

A camera fixture according to a comparative example is provided with a fitting portion that fits a liquid-tight camera housing case that houses a camera to an upper portion of a side surface of an air tank. This camera fixture includes a volume variable member (i.e., a buoyancy adjustment apparatus) covering the vicinity of the central portion of the side surface of the air tank and an air quantity adjuster that adjusts the quantity of air taken into the volume variable member.

When the air tank is transported in the sea, the valve of the air tank is opened to have air supplied into the inside of the volume variable member through the air quantity adjuster and increase the volume of the volume variable member, thus increasing the buoyancy of the volume variable member.

As a result, neutral buoyancy arises when the weight of the air tank and the buoyancy of the volume variable member are balanced with each other. This enables the diver to easily carry the originally heavy air tank. When capturing an image at the sea bottom, the air quantity adjuster is opened to remove air inside the volume variable member and reduce the volume of the volume variable member so as to reduce the buoyancy.

This allows the air tank mounted with the camera fixture to stand upright on the sea bottom with its buoyancy balance in which the density of the upper portion (the first portion) is low, and the density of the lower portion (the second portion) is high when arriving the sea bottom under its weight. At this time, the upright orientation of the air tank is stably maintained by attaching a weight to the lower portion of the air tank. By fastening the camera housing case to the fitting part of the camera fixture, the air tank can be used as a substitute for a tripod.

However, the conventional technology fails to adjust the orientation of the object including the first portion that generates the positive buoyant force and the second portion that generates the negative buoyant force or the negative buoyant force and faces trouble to impair the convenience of the object.

Embodiments of the present disclosure reduce the occurrence of trouble due to failure to adjust the orientation of an object to be adjusted.

An orientation adjustment system including an orientation adjuster is described below according to an embodiment of the present disclosure.

The orientation adjustment system according to an embodiment of the present disclosure includes an orientation adjuster that adjusts the orientation of the object whose orientation is to be adjusted (hereinafter, referred to as an/the orientation adjustment target object or simply referred to as a target object) in a fluid. The orientation adjustment target object according to an embodiment of the present disclosure includes an object whose buoyancy is to be adjusted (hereinafter, referred to as a/the buoyancy adjustment target object, or another target object) and a buoyancy adjuster that adjusts the buoyancy or the buoyancy balance of the buoyancy adjustment target object in a fluid.

The buoyancy adjustment target object is not limited to such an object, and may not include the buoyancy adjuster. The orientation adjustment system 1000 of the present embodiment includes, in addition to the orientation adjuster, at least a part of the buoyancy adjustment target object constituting the orientation adjustment target object and the buoyancy adjuster. Alternatively, the orientation adjustment system of the present embodiment may not include the buoyancy adjuster and the buoyancy adjustment target object constituting the orientation adjustment target object as long as the orientation adjustment system includes the orientation adjuster.

The following describes an embodiment in which the buoyancy adjustment target object refers to a housing portion housing a camera as an image-capturing device that is an object housed therein where the camera housed in the housing portion is used in a fluid (i.e., in water). The object housed in the housing portion may be any object that is not suitable to be used in the fluid as it is (i.e., not kept in the housing portion), including an electronic device other than the image-capturing device and an article other than the electronic device. The fluid is not limited to water, and may be another liquid such as seawater or gas.

FIG. 1 is a front view of an underwater housing 1 with a buoyancy adjuster 20 mounted onto a housing portion 10, according to an embodiment of the present disclosure.

Figure 2A:
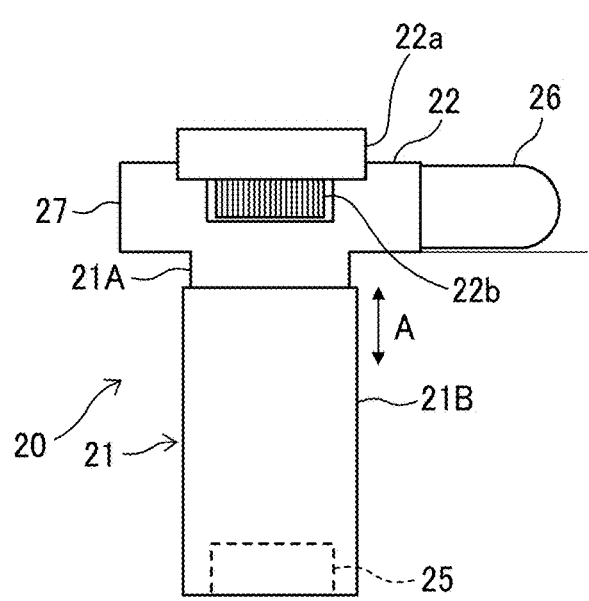
FIG. 2A and FIG. 2B are front views of the buoyancy adjuster extracted from the housing portion in FIG. 1.
Figure 2B:
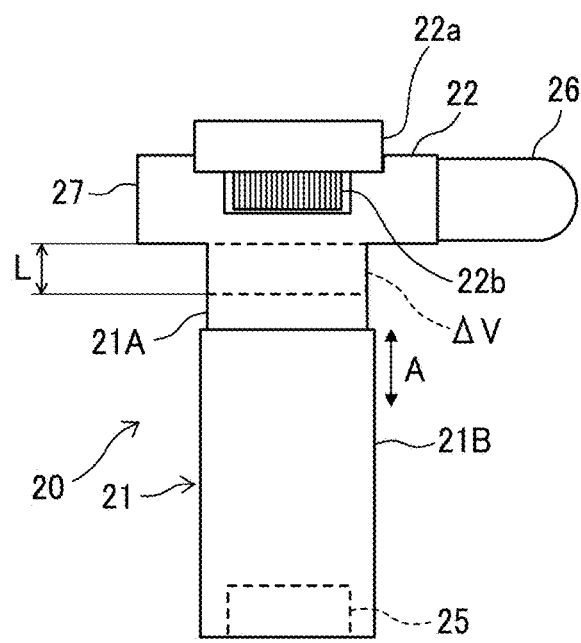

FIG. 2A and FIG. 2B are front views of the buoyancy adjuster 20 extracted from the housing portion 10.

Figure 3:
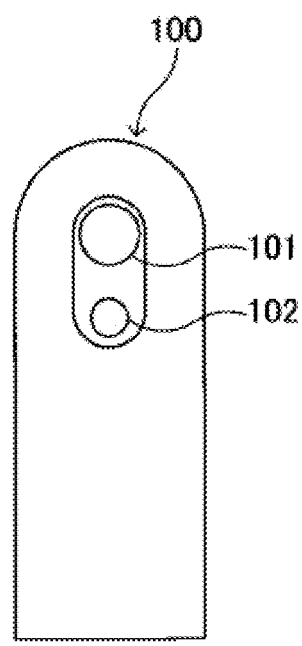
FIG. 3 is a front view of a camera housed in the housing portion in FIG. 1.

FIG. 3 is a front view of a camera 100 housed in the housing portion 10.

The underwater housing 1 according to an embodiment includes the housing portion 10 containing the camera 100 that is an object housed in the housing portion 10; and the buoyancy adjuster 20 that adjusts the buoyancy in water of the housing portion 10 containing the camera 100.

The housing portion 10 is formed of a light transmissive member to allow the camera 100 inside the housing portion 10 to capture an image of the outside of the housing portion 10. For example, the housing portion 10 is made of transparent plastic. The housing portion 10 further contains a holder for holding the camera 100. The holder holding the camera 100 enables the camera 100 to be held inside the housing portion 10.

The buoyancy adjuster 20 serves to adjust the buoyancy in water of the housing portion 10, which is the buoyancy adjustment target object, housing the camera 100. The buoyancy adjuster 20 according to an embodiment includes a volume-changeable portion 21 that changes its volume to change the buoyancy according to the Archimedes principle.

The volume-changeable portion 21 is a hermetically-sealed structure that includes a first structure portion 21A and a second structure portion 21B movable closer to (toward) and away from the first structure portion 21A in directions indicated by arrow A in FIGS. 2A and 2B. In this structure, the volume-changeable portion 21 changes its volume with the volume-changeable portion 21 hermetically sealed, by moving the second structure portion 21B closer to or away from the first structure portion 21A.

The buoyancy adjuster 20 includes a coupler 22 for coupling the volume-changeable portion 21 to the housing portion 10. The coupler 22 enables the volume-changeable portion 21 and the housing portion 10 to be detachably coupled to each other.

As illustrated in FIG. 3, the camera 100 is a 360-degree camera provided with imagers 101 at the upper portions of the front and the back of the camera 100. Each imager 101 is substantially rectangular and includes a super wide-angle lens. The camera 100 further includes an operation key 102 at the central portion of the front surface of the camera 100. The operation key 102 receives an operation, including an operation to start shooting and an operation to end shooting, input by a user.

The camera 100 is capable of capturing an image (i.e., a 360-degree image) of the entire space from side to side and up and down (i.e., an omnidirectional area) by causing the two imagers 101 at the front and the back of the camera 100 to capture approximately hemispherical images.

As illustrated in FIG. 1, the housing portion 10 of the underwater housing 1 according to an embodiment has a length sufficient to accommodate the camera 100 having the configuration in FIG. 3. Specifically, the housing portion 10 includes a housing body 12 having an open bottom as an entrance, through which the camera 100 is put in or taken out of the housing portion 10.

The housing portion 10 further includes a lid 13 for opening and closing the bottom (i.e., the entrance) and a lock 14 for fastening the lid 13 in its closed position to maintain the housing portion 10 hermetically sealed. This prevents water from entering the housing portion 10, and also prevents the camera 100 from getting wet with water even if the housing portion 10 is put in water.

The camera 100, inserted through the entrance (i.e., opening) at the bottom of the housing body 12, comes into contact with the inner wall of the housing portion 10 to be secured in its regular position upon fastening the lid 13 in its closed position by the lock.

The lid 13 of the housing portion 10 is provided with a screw hole into which a coupling screw 22b of a camera platform 22a mounted onto the coupler 22 of the buoyancy adjuster 20 is screwed. Screwing the coupling screw 22b of the coupler 22 into the screw hole enables the buoyancy adjuster 20 to be coupled to the lower end of the housing portion 10 as illustrated in FIG. 1. Preferably, the housing portion 10 includes an attachment portion, for example, on the lid 13, for attaching a strap to the housing portion 10 to prevent the underwater housing 1 from being separated from the user.

Further, at least a portion of the housing portion 10, corresponding to an image-capturing region of the camera 100, is formed of a transparent plastic to allow the camera 100 inside the housing portion 10 to capture an image of the outside of the housing portion 10. In the housing portion 10 according to an embodiment, the housing body 12 and the lid 13 are transparent. The housing body 12 has substantially spherical portions 12a covering the two imagers 101 to prevent adverse effects, such as image distortion, on images captured by the imagers 101 of the camera 100.

The camera 100 contained in the housing portion 10 according to an embodiment sinks in water by itself, but the housing portion 10 as a whole (i.e., the buoyancy-adjustment target object) containing the camera 100 (i.e., the camera 100 is contained in the housing portion 10) floats in water. Carrying or operating such a housing portion 10 in water, which usually floats in water is troublesome for users.

To deal with such an issue, the housing portion 10 is coupled to the buoyancy adjuster 20 to obtain the neutral buoyancy or the negative buoyant force that acts to balance the buoyancy of the buoyancy adjuster 20 and the housing portion 10 containing the camera 100 as a whole against the gravity of the buoyancy adjuster 20 and the housing portion 10.

Such a neutral buoyancy may be obtained only for the housing portion 10 containing the camera 100, without the buoyancy adjuster 20, by adjusting weight or volume of the housing portion 10. However, the housing portion 10 alone is difficult to reduce its buoyancy because in the housing portion 10 according to an embodiment, the camera 100 is relatively lightweight, and the housing body 12 as a whole has a shape that partially protrudes to have substantially-spherical portions 12a covering the two imagers 101. For this reason, the buoyancy adjuster 20 is used to obtain the neutral buoyancy or the negative buoyant force.

As described above, the buoyancy adjuster 20 according to an embodiment includes the volume-changeable portion 21 including the first structure portion 21A and the second structure portion 21B, to change the buoyancy by changing the volume. The first structure portion 21A is, for example, a large hollow cylindrical member.

The first structure portion 21A as such a long member enables the camera 100 to capture an image from a position away from the user. Notably, the first structure portion 21A is not limited to such a hollow cylindrical member, and may be a solid member or a member having a non-circular (e.g., rectangular) cross section.

The second structure portion 21B is also a long hollow cylindrical member. The second structure portion 21B is also not limited to such a hollow cylindrical member, and may be a solid member or a member having a non-circular (e.g., rectangular) cross section. Screw threads are formed on an outer circumferential surface of a lower-end portion of the first structure portion 21A, and screw grooves that engage with the screw threads are formed on an inner circumferential surface of an upper-end portion of the second structure portion 21B. The screw threads and the screw grooves constitute a screw structure.

In this configuration, rotating the second structure portion 21B by the user to tighten or loosen the engagement of the screw threads with the screw grooves (i.e., screw structure) allows the second structure portion 21B to move closer to or away from the first structure portion 21A in directions indicated by arrow A in FIG. 2.

Such an action thus changes the total volume of the volume-changeable portion 21 including the first structure portion 21A and the second structure portion 21B. For example, the user turns the second structure portion 21B to change from a state in which the engagement of the screw threads with the screw grooves (the screw structure) is tightened as illustrated in FIG. 2A to a state in which the engagement of the screw threads with the screw grooves (the screw structure) is loosened as illustrated in FIG. 2B. Then, the volume-changeable portion 21 is lengthened by the length L so that the volume of the volume-changeable portion 21 is increased by a portion surrounded by a broken line indicated by ΔV.

Further, the user reversely turns the second structure portion 21B to change from a state in which the engagement of the screw threads with the screw grooves (the screw structure) is loosened as illustrated in FIG. 2B to a state in which the engagement of the screw threads with the screw grooves (the screw structure) is tightened as illustrated in FIG. 2A. Then, the volume-changeable portion 21 is shortened by the length L so that the volume of the volume-changeable portion 21 is reduced by a portion surrounded by a broken line indicated by ΔV. In one or more embodiments, the first structure portion 21A and the second structure portion 21B serve as an operation receiver that receives an operation of a user to change the volume of the volume-changeable portion 21.

In this case, the screw structure of the screw threads 23a and the screw grooves 23b constitutes the operation receivers that receives an operation of a user to change the volume of the volume-changeable portion 21. However, no limitation is intended thereby. For example, the operation receiver may be a piston structure in which the second structure portion 21B slides closer to or away from the first structure portion 21A in directions indicated by arrow A in FIGS. 2A and 2B.

In addition, the operation reception unit of the present embodiment is configured such that the power for changing the volume of the volume-changeable portion 21 is generated by the operation force of the user, but is not limited thereto. For example, the operation receiving unit may be provided with an actuator (driving unit) such as a motor or a solenoid, and the driving force thereof may be used as power for changing the volume of the volume-changeable portion 21.

In this case, a controller that controls the actuator turns on and off the actuator or determines an operation amount or an operation direction according to an operation from the user operating the operation receiver, such as an operation key or an operation lever. This configuration allows a user to operate the volume-changeable portion 21 to change the volume with less labor for operation according to the user's desire.

Further, a seal member is disposed between the first structure portion 21A and the second structure portion 21B to keep the volume-changeable portion 21 hermetically sealed while the second structure portion 21B moves closer to or away from the first structure portion 21A.

The seal member is, for example, an O-ring made of resin.

The second structure portion 21B according to an embodiment is provided with a weight 25 at a lower portion thereof. As described above, the housing portion 10 containing the camera 100 as a whole floats in water, and the buoyancy adjuster 20, which is a hollow and hermetically-sealed structure, is lightweight. For this reason, the weight 25 is provided to gain the neutral buoyancy of the entirety of the buoyancy adjuster 20 and the housing portion 10 containing the camera 100.

To stabilize the orientation of the underwater housing 1 is a serious challenge in capturing an underwater image by using the camera 100 contained in the underwater housing 1 released from the user's hand in water. As described above, the underwater housing 1 according to an embodiment is configured such that the housing portion 10 floats in water, whereas the buoyancy adjuster 20 sinks in water under the weight 25 in the buoyancy adjuster 20.

This configuration stabilizes the orientation of the underwater housing 1 released from the user's hand, with the housing portion 10 (a first portion) at the upper portion and the buoyancy adjuster 20 (the second portion, or a buoyant portion) at the lower portion of the underwater housing 1. In other words, the orientation of the underwater housing 1 is stabilized when the underwater housing 1 faces in the vertical direction.

In some cases, however, the underwater housing 1 may rotate around the central axis in the longer-side direction of the underwater housing 1 (i.e., the central axis in the longer-side direction of the buoyancy adjuster 20 as a long member) in flowing water (i.e., undulating water), causing an unstable rotational orientation of the underwater housing 1. With such unstable rotational orientation, the camera 100 has difficulties capturing images as desired.

To prevent rotation of the underwater housing 1 in flowing water (undulating water) to stabilize the orientation of the underwater housing 1, the underwater housing 1 is provided with an orientation-stabilizable member, such as a blade 26, in the present embodiment. The blade 26 is a plate-shaped member protruding beyond the first structure portion 21A of the buoyancy adjuster 20 in the lateral direction (i.e., a direction orthogonal to the longer-side direction) and having its surfaces substantially parallel to the longer-side direction.

The blade 26 enables the underwater housing 1 likely to have a stable orientation where the surfaces of the blade 26 are parallel to a flow direction C, and enables the underwater housing 1 to face in a stable direction without rotating even in the flowing water, or the undulating water.

The blade 26 is preferably attachable to and detachable from the first structure portion 21A of the buoyancy adjuster 20. Alternatively, the blade 26 may be integrated with the first structure portion 21A as a single integrated unit. Further, the blade 26 may be configured to be housed in the buoyancy adjuster 20 by rotating or sliding the blade 26 relative to the first structure portion 21A.

In some examples, the blade 26 is attached to the second structure portion 21B or the housing portion 10, instead of the first structure portion 21A of the buoyancy adjuster 20. Further, the orientation-stabilizable member is not limited to the blade and may be any member that enable the orientation of the underwater housing 1 to be stable (i.e., enables the housing portion 10 to face in a stable direction).

Notably, in flowing water (i.e., undulating water), the housing portion 10 may swing (pivot) about the position near the center of gravity of the underwater housing 1 (e.g., near the weight 25), possibly causing an unstable orientation of the underwater housing 1. The blade as the orientation-stabilizable member is attached to the underwater housing 1 to deal with such an issue as well. In this case, the blade is disposed to have its surfaces substantially parallel to the horizontal direction (i.e., the lateral direction) of the underwater housing 1.

In one or more embodiments, the positive buoyant force F0 applied to the housing portion 10 as a first portion is determined by the weight of the housing portion 10, the volume of the housing portion 10, and the weight of the camera 100 contained in the housing portion 10.

In contrast, the negative buoyant force F1 applied to the buoyancy adjuster 20 as a second portion is determined by the weight M of the buoyancy adjuster 20, the volume of the buoyancy adjuster 20 (i.e., the volume of the volume-changeable portion 21), and the weight Mc of the weight 25 within the buoyancy adjuster 20.

As described above, changing the length of the volume-changeable portion 21 by the length L by moving the second structure portion 21B away from the first structure portion 21A to change the volume of the volume-changeable portion 21 by the amount $\Delta V$ changes the buoyancy (buoyant force) applied to the buoyancy adjuster 20 by an amount $\Delta F$ for the amount $\Delta V$ (i.e., the volumetric change amount).

To gain the neutral buoyancy of the underwater housing 1, the second structure portion 21B is moved closer to or away from the first structure portion 21A to adjust the volumetric change amount $\Delta V$ of the volume-changeable portion 21, so as to obtain the amount $\Delta F$ that satisfies $F0+(F1+\Delta F)=M+Mc$.

To float the underwater housing 1, the second structure portion 21B is moved closer to or away from the first structure portion 21A to adjust the volumetric change amount $\Delta V$ of the volume-changeable portion 21, so as to obtain the amount $\Delta F$ that satisfies $F0+(F1+\Delta F)>M+Mc$.

To sink the underwater housing 1, the second structure portion 21B is moved closer to or away from the first structure portion 21A to adjust the volumetric change amount $\Delta V$ of the volume-changeable portion 21, so as to obtain the amount $\Delta F$ that satisfies $F0+(F1+\Delta F)<M+Mc$.

In some embodiments, the weight 25 may not be disposed in the second structure portion 21B of the buoyancy adjuster 20, and may be disposed in the first structure portion 21A or in the housing portion 10.

The arrangement of the weight 25 is appropriately determined according to various purposes. For example, the center of gravity of the entirety of the underwater housing 1 containing the camera 100 may be positioned to facilitate handling of the underwater housing 1.

In one or more embodiments, the weight 25 is disposed in the second structure portion 21B at an end of the buoyancy adjuster 20, opposite the other end adjacent to the housing portion 10 containing the camera 100. This arrangement allows the center of gravity of the entirety of the underwater housing 1 containing the camera 100 to be positioned near the center of the underwater housing 1 (i.e., near the intermediate position of the first structure portion 21A), thus facilitating handling of the underwater housing 1 on the ground, for example.

The configuration according to an embodiment in which the weight 25 is disposed in the second structure portion 21B that is movable closer to and away from the first structure portion 21A causes more movement of the center of gravity of the underwater housing 1 during a change in the volume of the volume-changeable portion 21 by moving the second structure portion 21B closer to or away from the first structure portion 21A.

This enables adjustment of the center of gravity of the entirety of the underwater housing 1 by moving the second structure portion 21B closer to or away from the first structure portion 21A. Such an adjustment enables a balance between the positions at which buoyancy and gravity act on the underwater housing 1, respectively, and thus facilitates handling of the underwater housing 1.

For example, a user, who desires to capture a 360-degree image using the camera 100 in water (e.g., in the sea), goes underwater carrying the underwater housing 1 with the camera 100 contained in the housing portion 10. At this time, the underwater housing 1 provided with the housing portion 10 and without the buoyancy adjuster 20 has a too large buoyancy, causes difficult handling while submerging and capturing an image, and further restricts the movement of the user carrying such an underwater housing 1 in water.

The underwater housing 1 according to an embodiment, in which the housing portion 10 is coupled to the buoyancy adjuster 20, provides neutral buoyancy of the underwater housing 1 as a whole. Using such a neutral buoyancy enables the underwater housing 1 to be kept floating near the hand of the user without suddenly separating therefrom when the user releases the underwater housing 1. This eliminates a need for the user to continue holding the underwater housing 1 in water and also a need for using, for example, a strap to be coupled to the underwater housing 1 to allow the user to carry the underwater housing 1. Thus, the underwater housing 1 is easily handled by the user, and the movement of the user holding the underwater housing 1 in water is not restricted.

Further, in one or more embodiments, rotating the second structure portion 21B by the user to move the second structure portion 21B closer to or away from the first structure portion 21A enables a change in the volume of the volume-changeable portion 21 to thus change the buoyancy of the housing portion 10 containing the camera 100.

In this configuration, the buoyancy of the housing portion 10 containing the camera 100 is adjusted according to an operation by the user. This configuration allows the user to adjust the buoyancy as desired.

In one or more embodiments, rotating the second structure portion 21B by the user to increase the volume of the volume-changeable portion 21 of the underwater housing 1 having the neutral buoyancy increases the buoyancy of the underwater housing 1 and cause the underwater housing 1 to float in water. Thus, the underwater housing 1 alone is caused to float upward (rise) in water and capture an underwater image (i.e., an image of an underwater area above and away from the user) after being released from the user's hand.

In contrast, rotating the second structure portion 21B by the user to reduce the volume of the volume-changeable portion 21 having the neutral buoyancy reduces the buoyancy of the underwater housing 1 and causes the underwater housing 1 to sink. Thus, the underwater housing 1 alone goes down below the surface of water and captures an underwater image (i.e., an image of an underwater area below and away from the user) after being released from the user's hand.

Figure 4:
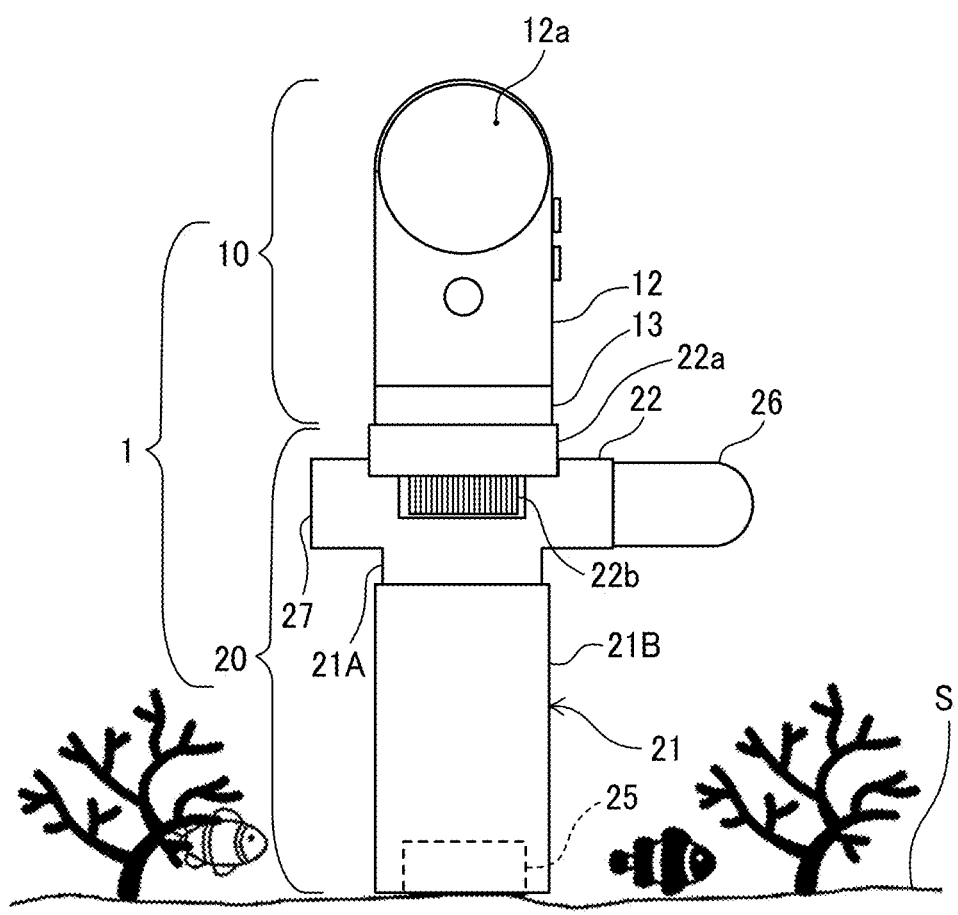
FIG. 4 is an illustration of the underwater housing that is sunk to the water bottom (sea bottom) with a reduction in the volume of a volume-changeable portion of the buoyancy adjuster.

FIG. 4 is an illustration of the underwater housing 1 that is sunk to the water bottom (sea bottom) with a reduction in the volume of a volume-changeable portion 21 of the buoyancy adjuster 20.

The underwater housing 1 of the present embodiment allows the housing portion 10 serving as a buoyancy-target object to be sunk to the sea bottom S, by adjusting the buoyancy using the buoyancy adjuster 20. This further allows the camera 100 in the housing portion 10 to capture images of fish and coral in the vicinity of the sea bottom S using a self-timer function or a moving image function of the camera 100.

The underwater housing 1 includes the housing portion 10 as a first portion that generates positive buoyant force and the buoyancy adjuster 20 as a second portion that generates neutral buoyancy or negative buoyant force. As illustrated in FIG. 4, such an underwater housing 1 has the orientation changed by the difference in buoyancy between the housing portion 10 and the buoyancy adjuster 20 so that the housing portion 10 is positioned above the buoyancy adjuster 20.

The weight 25 that generates the negative buoyant force exceeding the positive buoyant force of the underwater housing 1 is used to adjust the buoyancy of the underwater housing 1 while maintaining the orientation of the underwater housing 1. The weight 25 does not change the orientation of the underwater housing 1 (i.e., the orientation of the underwater housing 1 with the housing portion 10 positioned above the buoyancy adjuster 20).

If the underwater housing 1 fails to have its orientation changed from the orientation in FIG. 4, the underwater housing 1, for example, fails to have its orientation changed to position the camera 100 in the underwater housing 1 at a height position lower than the height position of the camera 100 in FIG. 4.

As a result, the camera 100 fails to capture an image from a height position closer to the sea bottom S than the height position of the camera 100 in FIG. 4 and fails to respond to a request of a user who wants to capture an image from a position closer to the sea bottom S. Thus, convenience of the user is impaired.

Such an issue also occurs when the underwater housing 1 is floated in water (or the sea) during use, in addition to when the underwater housing 1 is landed on the sea bottom S during use. In other words, depending on how the user uses the underwater housing 1, the user may desire to change the orientation of the underwater housing 1 from the orientation which the housing portion 10 is positioned above the buoyancy adjuster 20 to the orientation in which the height position of the housing portion 10 relative to the buoyancy adjuster 20 is changed. If such a demand cannot be met, convenience of the user may be impaired.

Figure 5:
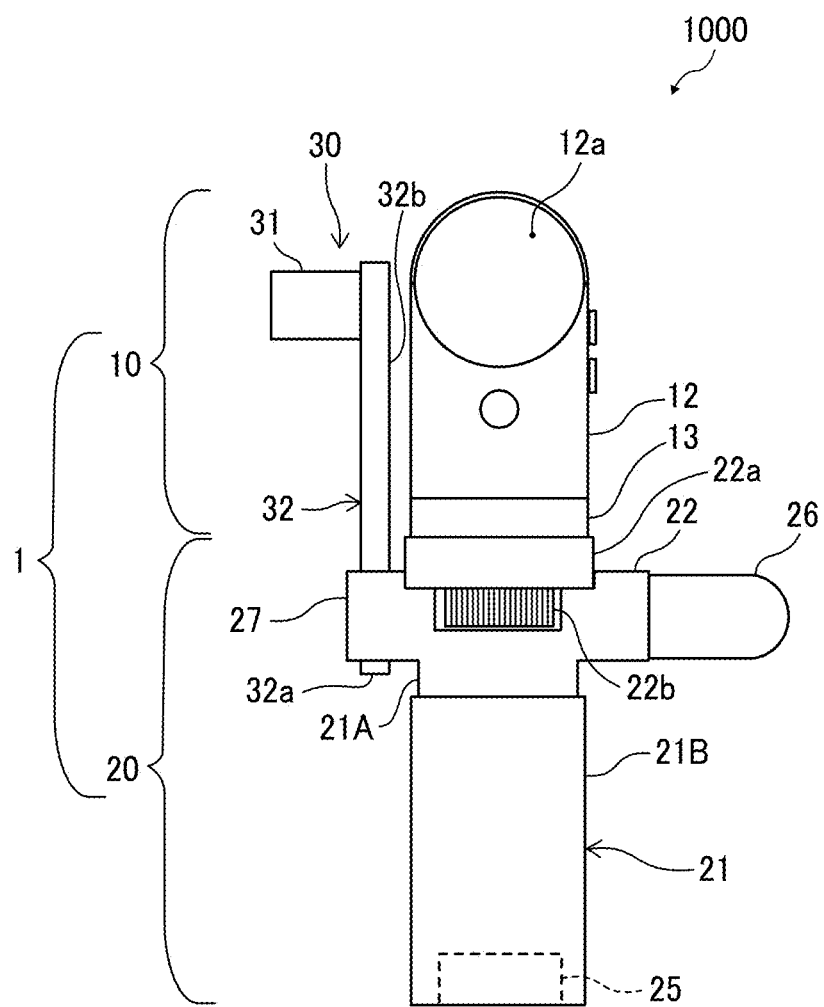
FIG. 5 is a front view of the underwater housing attached with the orientation adjuster.

FIG. 5 is a front view of the underwater housing 1 serving as the orientation adjustment target object attached with an orientation adjuster 30 according to an embodiment of the present disclosure.

The orientation adjuster 30 of the present embodiment includes: a weight portion 31 having a negative buoyant force exceeding the positive buoyant force of the housing portion 10; and an attachment portion 32 detachably attached to a snap-fit receiving portion 27 that serves as an attachment position of the attachment portion 32 on the underwater housing 1. The snap-fit receiving portion 27 is disposed at the coupler 22 of the underwater housing 1 and has a hole shape to allow a snap-fit portion 32a formed at the lower portion of the attachment portion 32 of the orientation adjuster 30 to be fit into the snap-fit receiving portion 27.

The snap-fit portion 32a is snap-fit into the snap-fit receiving portion 27 so as to be fixed thereto. This allows the orientation adjuster 30 to attached to the underwater housing 1. The orientation adjuster 30 is removed from the underwater housing 1 by releasing the snap-fit.

The method of attaching the orientation adjuster 30 to the underwater housing 1 is not limited to the snap-fit, and may include another method of detachably screwing the orientation adjuster 30 into the underwater housing 1 so as to attach the orientation adjuster 30 to the underwater housing 1. According to the usage situation of the user, such a detachable orientation adjuster 30 is removed from the underwater housing 1 when not in use so that the underwater housing 1 is used in a state as illustrated in FIG. 1. This enables a reduction in the weight and size of the underwater housing 1 and thus improves convenience.

Figure 6:
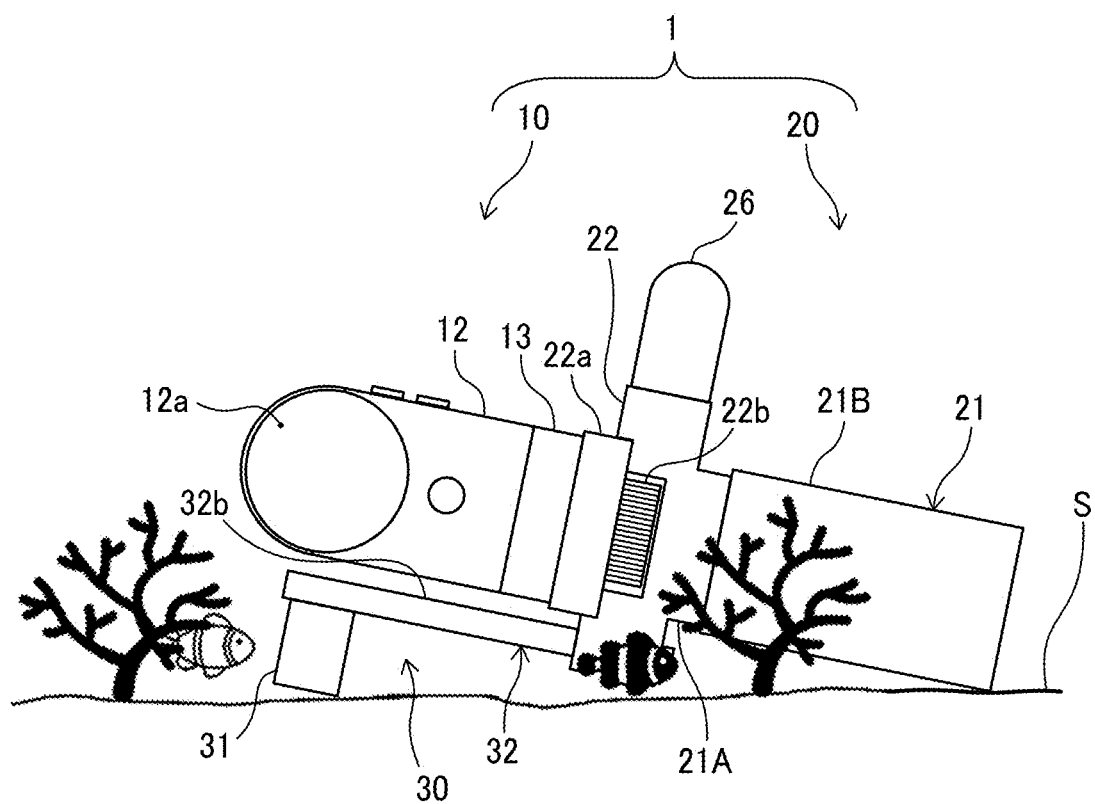
FIG. 6 is a front view of the underwater housing attached with the orientation adjuster with the orientation of the underwater housing changed.

FIG. 6 is a front view of the underwater housing 1 attached with the orientation adjuster 30 according to an embodiment, with the orientation of the underwater housing changed.

The volume and weight of the weight portion 31 in the orientation adjuster 30 is designed to allow the housing portion 10 of the underwater housing 1 to achieve the negative buoyant force exceeding the positive buoyant force. When the underwater housing 1 is attached with the orientation adjuster 30 at a prescribed position (see FIG. 5) of which the weight 31 is disposed, the underwater housing 1 has the orientation in which the height position of the housing portion 10 relative to the buoyancy adjuster 20 is lowered than in the orientation of the underwater housing 1 not attached with the weight portion 31, which is caused by the negative buoyant force of the weight portion 31.

In the present embodiment, as illustrated in FIG. 6, the orientation of the underwater housing 1 is changed to a position at which the weight portion 31 disposed at the prescribed position of the orientation adjuster 30 lands on the sea bottom.

As a result, the underwater housing 1 maintains its orientation with both the orientation adjuster 30 and the buoyancy adjuster 20 landed on the sea bottom, meaning that the underwater housing 1 is maintained in a lying position (i.e., the longitudinal direction of the underwater housing 1 is substantially facing the horizontal direction, or the longitudinal direction of the underwater housing 1 is substantially parallel to the horizontal direction). As a result, the camera 100 in the underwater housing 1 is positioned lower than the height position in FIG. 4, and the camera 100 can capture an image from a height position closer to the sea bottom S than the height position in FIG. 4. This allows the camera 100 in the underwater housing 1 to capture images of fish and coral in the vicinity of the sea bottom S from a closer position.

The weight portion 31 of the orientation adjuster 30 is preferably disposed near the housing portion 10 as the first portion of the underwater housing 1. However, in many cases as in the present embodiment, the snap-fit receiving portion 27 serving as the attachment position of the orientation adjuster 30 at the underwater housing 1 is assumed to be away from the prescribed position of the weight portion 31.

In order to dispose the weight portion 31 at the prescribed position in such cases as well, the attachment portion 32 of the present embodiment includes an extension portion 32b extendable from the snap-fit receiving portion 27 of the underwater housing 1 to the prescribed position while the orientation adjuster 30 is attached onto the underwater housing 1. The extension portion 32b relaxes the restriction of the relative position between the prescribed position at which the weight portion 31 is to be disposed and the attachment position of the orientation adjuster 30 at the underwater housing 1. This enhances the flexibility in the arrangement of the prescribed position for the weight portion 31 and the attachment position at the underwater housing 1.

In the present embodiment, if the extension portion 32b is further lengthened so that the weight portion 31 is disposed more distant from the housing portion 10 in the longitudinal direction of the extension portion 32b, the degree of inclination of the underwater housing 1 (i.e., the angle between the longitudinal direction and the vertical direction) is increased.

In this case, the camera 100 in the housing portion 10 can be brought closer to the sea bottom. However, a longer extension portion 32b causes more difficulties in carrying the underwater housing 1 attached with the orientation adjuster 30 or the orientation adjuster 30 itself in water. For example, the extension portion 32b may collide with something and easily break.

In contrast, a shorter extension portion 32b will cause the weight portion 31 to be closer to the buoyancy adjuster 20 as the second potion. The weight of the weight portion 31 is to be increased to sink the housing portion 10 against the positive buoyant force of the housing portion 10.

In this case, since the weight is increased, it is difficult to carry. However, in order to reduce the size of the weight portion 31 in an attempt to overcome such difficulties in carrying the underwater housing 1, the weight portion 31 is to be made of small and heavy material. Such material is limited, and the cost increases.

For this reason, in the present embodiment, the weight portion 31 of the orientation adjuster 30 is preferably disposed near the housing portion 10 as the first portion of the underwater housing 1. However, in the present embodiment, since the camera 100 is housed in the housing portion 10, the weight portion 31 is disposed near the lens of the camera 100 in the housing portion 10 when disposed near the housing portion 10. In this case, however, the orientation adjuster 30 might be reflected in the image captured by the camera 100 of the underwater housing 1.

To avoid such a situation, the orientation adjuster 30 is preferably disposed outside the image-capturing range of the camera 100 of the underwater housing 1. When the camera 100 is a typical camera, the orientation adjuster 30 can be disposed outside the image-capturing range by disposing the weight portion 31 near the side surface of the camera 100.

When the camera 100 is a 360-degree camera as in the present embodiment, there is a region that is not captured in general, and an image of the region is generated by image processing based on a surrounding image. For the case of the 360-degree camera as well, the orientation adjuster 30 can be disposed outside the image-capturing range. Since the location and size of that region vary depending on the type of camera, the position and size of the orientation adjuster 30 may be designed depending on the camera.

In addition, the orientation adjuster 30 according to the present embodiment is configured to include the weight portion 31 at the tip end of the extension portion 32b. Although the weight portion 31 and the extension portion 32b may be formed as a single integrated unit, it is preferable that the weight portion 31 and the extension portion 32b are separate from each other as different members.

For example, in a case where a metal-cut component is used as the weight portion 31 in order to make the weight portion 31 smaller and heavier (to increase its density), if the extension portion 32*b* is integral with the weight portion 31, the manufacturing cost increases. In such a case, if the extension portion 32*b* is made of a material having a density lower than that of the weight portion 31, and is formed as a resin-molded product, for example, the number of expensive metallic components can be reduced, and cost reduction can be achieved.

In addition, when the weight portion 31 and the extension portion 32*b* are separate from each other as different members, the weight portion 31 may be attachable to and detachable from the extension portion 32*b*. As a method of attaching the weight portion 31 to the extension portion 32*b*, it is preferable to use a method of easily removing the weight portion 31 in water, such as a screw fastening method or a magnet fixing method.

When the orientation adjuster 30 is not used, carrying the orientation adjuster 30 in water by removing only the weight portion 31 and hooking the weight portion 31 on a hook or the like is easier than carrying the entire orientation adjuster 30 including the weight portion 31 and the extension portion 32*b*.

When the attachment portion 32 including the extension portion 32*b* is a member of the underwater housing 1, the underwater housing 1 and the attachment portion 32 may be the orientation adjustment target object, and the weight portion 31 may be the orientation adjuster 30.

Figure 7:
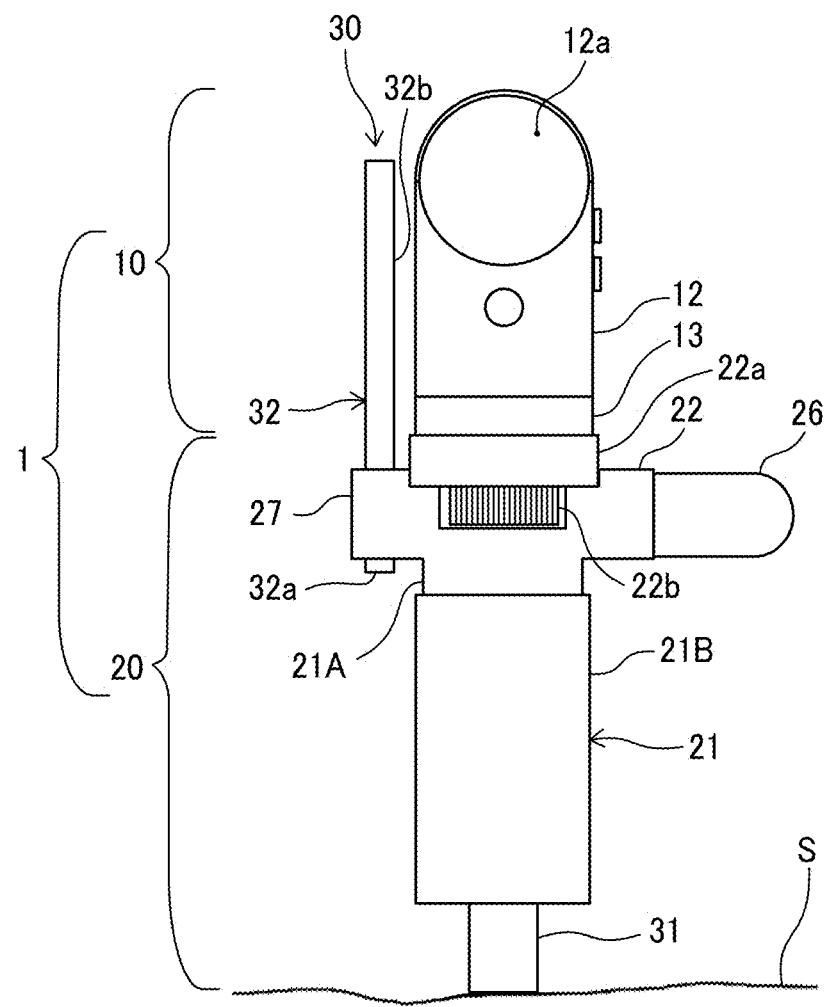
FIG. 7 is a front view of the orientation adjuster attached to another location of the underwater housing.

In addition, for example, as illustrated in FIG. 7, a screw hole may be provided as another attachment position at the lower portion of the buoyancy adjuster 20, and the screw portion (an attachable portion) of the screw fastening weight portion 31 detached from the buoyancy adjuster 20 may be screwed into the screw hole of the buoyancy adjuster 20.

In such a way, by adopting a configuration in which the arrangement of the weight portion 31 with respect to the underwater housing 1 can be changed, it is possible to further improve convenience for the user. The lower portion of the buoyancy adjuster 20 where the weight portion 31 is disposed is another prescribed position where the negative buoyant force that arises in the buoyancy adjuster 20 is increased by the negative buoyant force of the weight portion 31. Such an arrangement increases the stability of the orientation, for example, at the sea bottom compared to the case in which the buoyancy is adjusted by the buoyancy adjuster 20 alone.

First Modification

The following describes one modification (i.e., the first modification) of the orientation adjuster 30 according to an embodiment of the present disclosure.

The first modification is an example in which the attachment position at which the attachment portion 32 of the orientation adjuster 30 is detachably attached to the underwater housing 1 is at the housing portion 10 as the first portion instead of at the coupler 22 of the buoyancy adjuster 20 as the second portion.

Figure 8A:
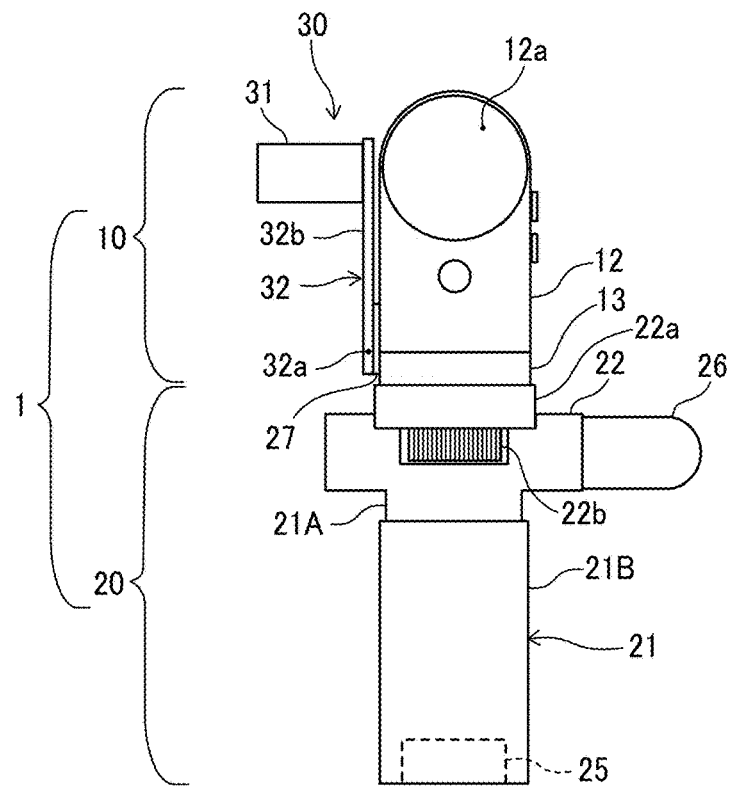
FIG. 8A is a front view of an underwater housing attached with an orientation adjuster according to a first modification of an embodiment.

FIG. 8A is a front view of an underwater housing 1 attached with an orientation adjuster 30 according to a first modification of an embodiment.

Figure 8B:
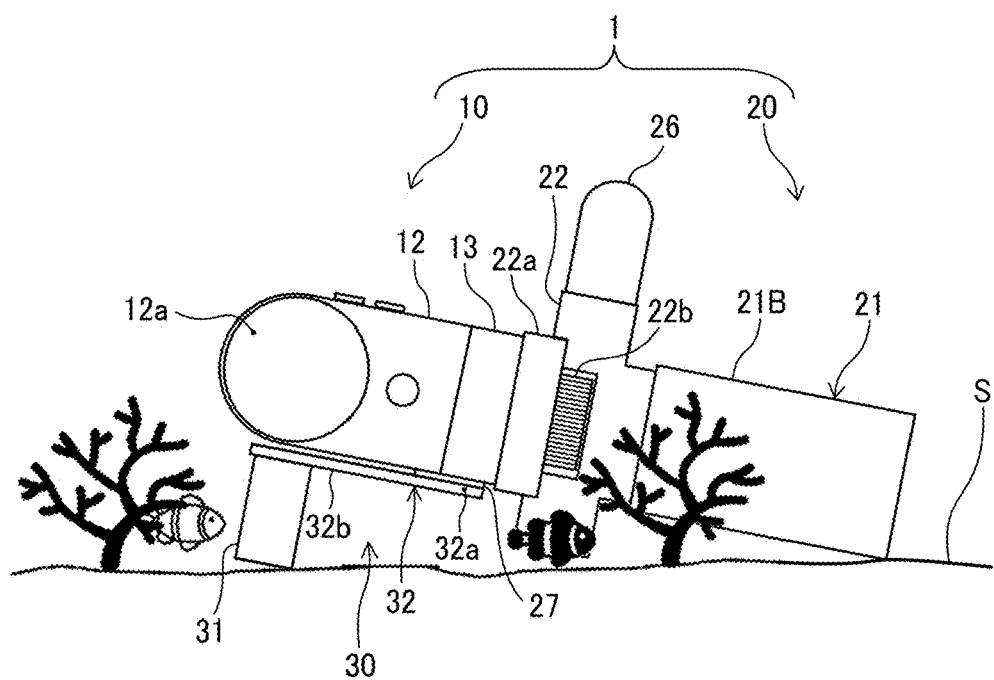
FIG. 8B is a front view of the underwater housing with its orientation changed by using the orientation adjuster.

FIG. 8B is a front view of the underwater housing 1 with its orientation changed by using the orientation adjuster 30 according to the first modification.

In the first modification, the snap-fit receiving portion 27 as the attachment position is provided at the housing portion 10 of the underwater housing 1. The snap-fit portion 32*a* of the attachment portion 32 of the orientation adjuster 30 is attached into the snap-fit receiving portion 27. The method of attaching the orientation adjuster 30 to the underwater housing 1 is not limited to the snap-fit as in the above-described embodiment.

In the first modification, as illustrated in FIG. 8B, the orientation of the underwater housing 1 can be changed to a position at which the weight portion 31 of the orientation adjuster 30 lands on the sea bottom because the weight portion 31 is disposed at the same prescribed position as in the above-described embodiment. Similarly to the above-described embodiment, this allows the camera 100 in the underwater housing 1 to capture images of fish and coral in the vicinity of the sea bottom S from a closer position.

In the first modification, the snap-fit portion 32*a* of the attachment portion 32 in the orientation adjuster 30 is detachably attached to the snap-fit receiving portion 27 of the housing portion 10 in the underwater housing 1. However, no limitation is intended therein.

Figure 9A:
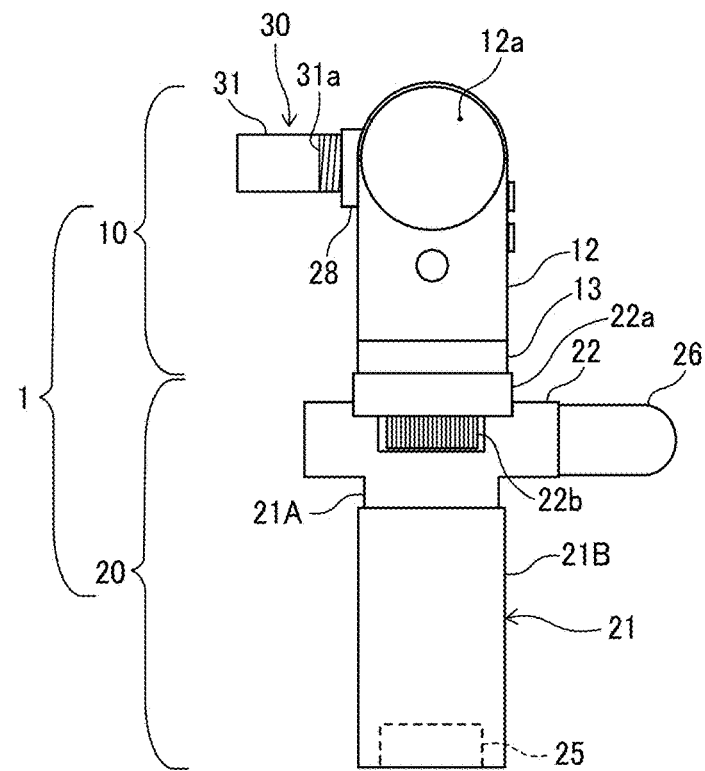
FIG. 9A is a front view of an underwater housing attached with an orientation adjuster according to another example of the first modification.

In another example as illustrated in FIG. 9A, the screw portion 31*a* of the weight portion 31, which serves as a portion of the orientation adjuster 30 to be attached to the housing portion 10, may be detachably screwed into the screw hole 28 that is the attachment position at the housing portion 10 of the underwater housing 1. Such a configuration eliminates the use of the snap-fit portion 32*a* and the extension portion 32*b* from the configuration of the orientation adjuster 30 according to the above-described embodiment and thus achieves a simpler configuration of the orientation adjuster 30.

Figure 9B:
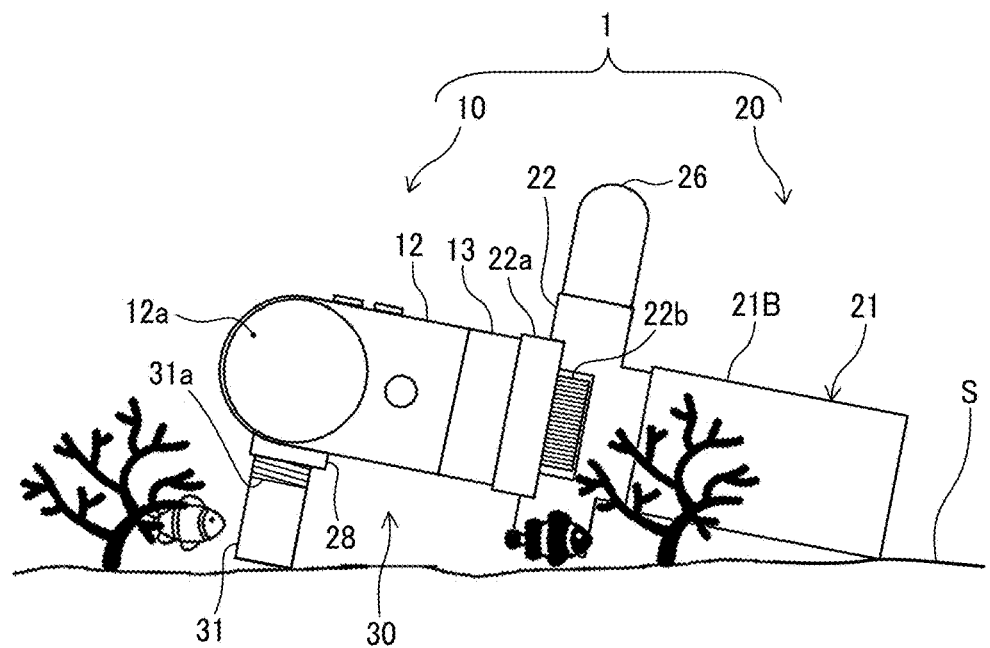
FIG. 9B is a front view of the underwater housing with its orientation changed by using the orientation adjuster.

In this case as well, as illustrated in FIG. 9B, the orientation of the underwater housing 1 can be changed to a position at which the weight portion 31 of the orientation adjuster 30 lands on the sea bottom. Similarly to the above-described embodiment, this allows the camera 100 in the underwater housing 1 to capture images of fish and coral in the vicinity of the sea bottom S from a closer position.

Second Modification

The following describes another modification (i.e., the second modification) of the orientation adjuster 30 according to an embodiment of the present disclosure.

In the second modification, a weight portion 33 of the orientation adjuster 30 includes a volume-changeable portion that changes its volume to change the buoyancy of the underwater housing 1.

Figure 10:
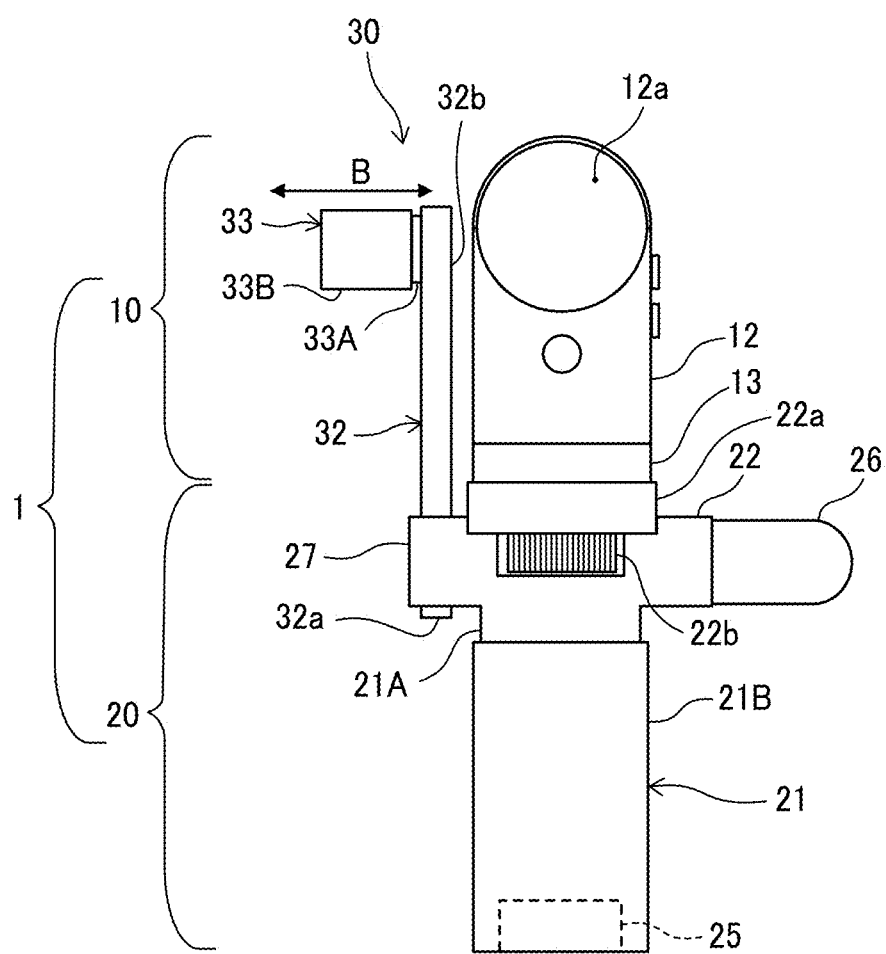
FIG. 10 is a front view of an underwater housing attached with an orientation adjuster according to a second modification of an embodiment.

FIG. 10 is a front view of an underwater housing 1 attached with an orientation adjuster 30 according to a second modification of an embodiment.

The weight portion 33 of the orientation adjuster 30 according to the second modification includes the volume-changeable portion 21 composed of a first structure portion 33A and a second structure portion 33B, to change the buoyancy by changing the volume. The basic configuration of the volume-changeable portion is similar to the volume-changeable portion 21 of the buoyancy adjuster 20 according to the above-described embodiment.

The first structure portion 33A has one end attached onto the end portion of the extension portion 32*b* of the orientation adjuster 30. Screw threads are formed on an outer circumferential surface of the other end of the first structure portion 33A, and screw grooves that engage with the screw threads are formed on an inner circumferential surface of a one end of the second structure portion 33B. The screw threads and the screw grooves constitute a screw structure.

In this configuration, rotating the second structure portion 33B by the user to tighten or loosen the engagement of the screw threads with the screw grooves (i.e., screw structure) allows the second structure portion 33B to move closer to or away from the first structure portion 33A in directions indicated by arrow B in FIG. 10. Such an action thus changes the total volume of the volume-changeable portion of a weight portion 33 composed of the first structure portion 33A and the second structure portion 33B.

Figure 11A:
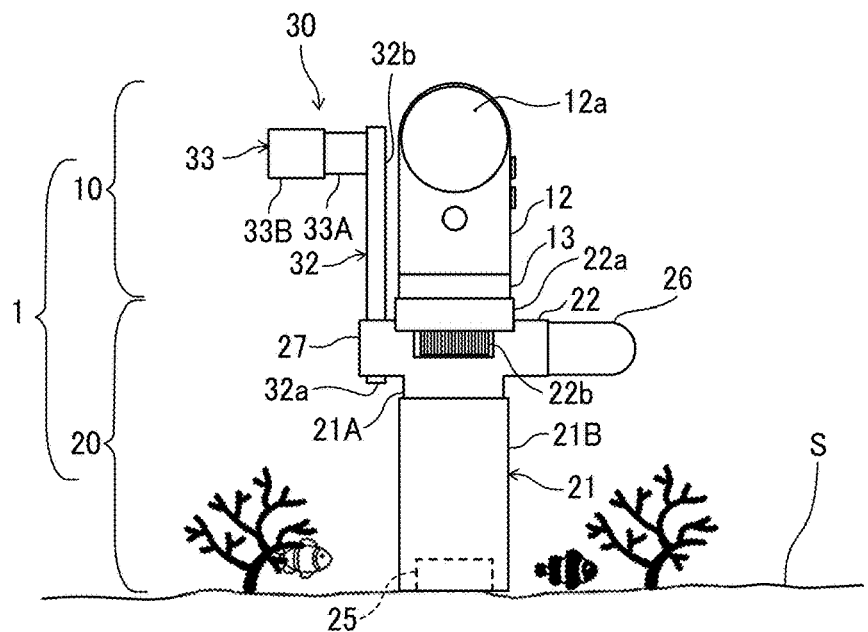
FIGS. 11A, 11B, and 11C are front views of an underwater housing attached with the orientation adjuster in FIG. 10 with the orientation of the underwater housing changed by changing the volume of a volume-changeable portion of a weight portion.

For example, it is assumed that the user rotates the second structure portion 33B to loosen the screw structure (i.e., loosen the engagement of the screw threads with the screw grooves) as illustrated in FIG. 11A to increase the volume of the volume-changeable portion of the weight portion 33 (i.e., reach a first volume) and sink the underwater housing 1 to the bottom of water (the sea bottom).

In this case, since the weight portion 33 has positive buoyant force, the posture of the underwater housing 1 is stabilized with an orientation in which the longitudinal direction is oriented in the vertical direction, which is caused by the buoyancy balance between the positive buoyant force of the housing portion 10 and the negative buoyant force of the buoyancy adjuster 20.

Figure 11B:
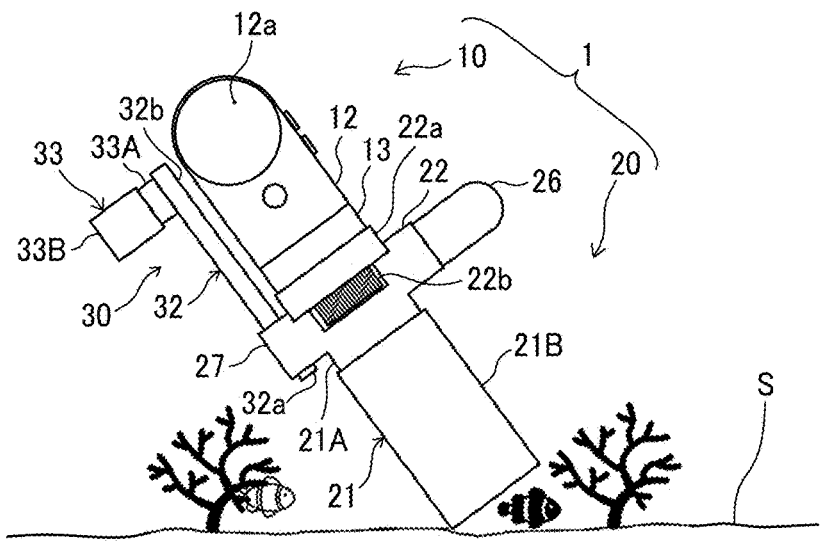
Figure 11C:
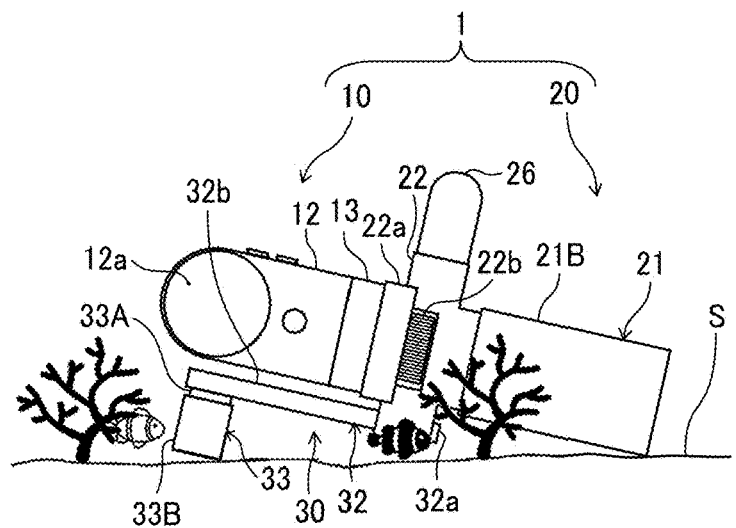

For another example, it is assumed that the user reversely rotates the second structure portion 33B to tighten the screw structure (i.e., tighten the engagement of the screw threads with the screw grooves) as illustrated in FIG. 11C to reduce the volume of the volume-changeable portion of the weight portion 33 (i.e., reach a second volume) and sink the underwater housing 1 to the bottom of water (the sea bottom).

In this case, the weight portion 33 has the negative buoyant force that causes the height position of the housing portion 10 relative to the buoyancy adjuster 20 to be lower than the height position in FIG. 11A. As a result, the underwater housing 1 maintains its orientation with both the orientation adjuster 30 and the buoyancy adjuster 20 landed on the sea bottom, meaning that the underwater housing 1 is maintained in a lying position (i.e., the longitudinal direction of the underwater housing 1 is substantially facing the horizontal direction, or the longitudinal direction of the underwater housing 1 is substantially parallel to the horizontal direction).

In the present embodiment, it is assumed that the user rotates the second structure portion 33B to put the underwater housing 1 in an intermediate state between the state in FIG. 11A and the state in FIG. 11C, i.e., put the volume-changeable portion of the weight portion 33 to the state in FIG. 11B (the second volume) and sink the underwater housing 1 to the bottom of water (the sea bottom). In this case, the weight portion 33 has a negative buoyant force equivalent to the positive buoyant force of the housing portion 10. As a result, the orientation of the underwater housing 1 can be maintained such that the height position of the housing portion 10 relative to the buoyancy adjuster 20 is lower than that in the state of FIG. 11C and higher than that in the state of FIG. 11A, as illustrated in FIG. 11B.

By using the weight portion 33 including the volume-changeable portion as in the second modification, the buoyancy of the weight portion 33 can be finely adjusted, and the orientation of the underwater housing 1 can be finely adjusted as illustrated in FIGS. 11A, 11B, and 11C.

Using the weight portion 33 including the volume-changeable portion as in the second modification enables adjustment of the orientation of the underwater housing 1 with the orientation adjuster 30 attached to the underwater housing 1. The method of attaching the orientation adjuster 30 onto the underwater housing 1 is not limited to the method of detachably attaching the orientation adjuster 30 onto the underwater housing 1, and may be a method of attaching the orientation adjuster 30 onto the underwater housing 1 in a non-detachable state (bonding, integral formation, or the like).

Although the second modification uses the volume-changeable portion to change the buoyancy of the weight portion 33, no limitation is indicated therein. In some examples, a configuration that takes air in and out may be adopted to change the volume and adjust the buoyancy of the underwater housing.

The method of adjusting the orientation of the underwater housing 1 with the orientation adjuster 30 attached onto the underwater housing 1 may not involve the configuration that changes the buoyancy of the weight portion 33 as the volume-changeable portion. In some examples, the weight portion 31 is movable along the extension portion 32b to change the position of the weight portion 31 in the longitudinal direction of the extension portion 32b, so as to adjust the orientation of the underwater housing 1.

The configurations described above are examples, and aspects of the present disclosure provide respective effects as follows.

Aspect 1

According to Aspect 1, an orientation adjuster 30 includes: a weight portion 31 or 33 attached onto a target object (e.g., an underwater housing 1) including a second portion (e.g., a housing portion 10) having a positive buoyancy and a second portion (e.g., a buoyancy adjuster 20) having a negative buoyancy in a fluid. The weight portion 31 or 33 having a negative buoyancy exceeding the positive buoyancy of the second portion. The weight portion is disposed at the prescribed position of the target object to cause a first height position of the second portion relative to the second portion to be lower than a second height position of the second portion relative to the second portion of the target object not attached with the weight portion 31 or 33, using the negative buoyancy of the weight portion 31 or 33 when the target object floats in the fluid or lands on the bottom of the fluid, so as to adjust orientation of the target object in the fluid.

The target object in a fluid including the first portion that generates the positive buoyancy and the second portion that generates the neutral buoyancy or the negative buoyancy have an orientation in which the first portion is above the second portion due to a difference in buoyancy between the first portion and the second portion. A typical weight portion having a negative buoyancy exceeding the positive buoyancy of the first portion is used to adjust the buoyancy of the target object while maintaining the orientation of the target object. In such a configuration, the target object fails to change the height position of the first portion relative to the second position and thus fails to change its orientation using the negative buoyancy of the weight portion.

In this configuration of Aspect 1, the weight portion is disposed at a prescribed position of the orientation adjuster attached onto the target object, so that the negative buoyancy of the weight portion causes the height position of the first portion relative to the second portion to be lower than the height position of the first portion of the target object not attached with the orientation adjuster. The orientation adjuster of Aspect 1 attached onto the target object can adjust the orientation of the target object to lower the height position of the first portion relative to the second portion. Thus, the occurrence of trouble (e.g., the convenience of the target object is impaired) due to failure to adjust the orientation of the target object can be reduced.

Aspect 2

According to Aspect 2, the orientation adjuster of Aspect 1 further includes an attachment portion 32 or 31a detachably attachable at an attachment position (e.g., the snap-fit receiving portion 27 and a screw hole 28) of the orientation adjustment target object. The weight portion (31) is detachably attached to the attachment portion This configuration allows the orientation adjuster to be detached from the orientation adjustment target object according to a use situation of the user when not in use and thus increases the convenience of the user.

Aspect 3

According to Aspect 3, in the orientation adjuster of Aspect 2, the attachment portion 32 includes an extension portion 32b extending from the attachment position to the prescribed position. The extension portion 32b has a lower density than that of the weight portion 31.

This configuration of Aspect 3 allows the size reduction of the weight portion by using a material having a high density, and also produces the extension portion using less costly material having a density lower than that of the weight portion. Thus, the attachment portion to be attached can be manufactured less costly than when the attachment portion as a whole is made of material having the same high-density material as the weight portion.

Aspect 4

According to Aspect 4, in the orientation adjuster of Aspect 3, the weight portion is made of metal, and the extension portion is made of resin.

This configuration allows size reduction of the weight portion by producing the weigh portion made of a metal having a high density, and also enables cost reduction for manufacturing the extension portion by producing the extension portion made of a resin having a low cost and a low processing cost.

Aspect 5

According to Aspect 5, in the orientation adjuster of any one of Aspect 2 to Aspect 4, the attachment portion 31 attaching the weight portion (31) is detachably attached at another attachment position of the orientation adjustment target object (e.g., a screw hole disposed at the lower portion of the buoyancy adjuster 20) different from the attachment position. The attachment portion (31a) attached at said another attachment position increases the negative buoyance of the second portion. When the attachment portion is attached at said another attachment position of the orientation adjustment target object, the weight portion is disposed at another prescribed position so that the negative buoyancy of the weight portion increases the negative buoyancy that arises in the second portion.

In this configuration, the orientation adjuster is detached from the orientation adjustment target object when not in use (i.e., when the height position of the first portion relative to the second portion is not lowered by the negative buoyancy of the weight portion). If the detached orientation adjuster is stored separately from the orientation adjustment target object, the convenience of the user may be impaired.

This configuration of Aspect 5 allows the orientation adjuster detached from the attachment position of the orientation adjustment target object to be kept attached at another attachment position of the orientation adjustment target object. This increases the convenience of the user more than when the detached orientation adjuster is stored separately from the orientation adjustment target object.

Further, this configuration causes an increase in the negative buoyancy that occurs in the second portion by using the negative buoyancy of the weight portion as the detached orientation adjuster is attached at another attachment position of the orientation adjustment target object. Therefore, even if the detached orientation adjuster is attached to another attachment position of the orientation adjustment target object, the stability of the orientation of the orientation adjustment target object from which the orientation adjuster is detached can be increased.

Aspect 6

According to Aspect 6, in the orientation adjuster of any one of Aspect 1 to Aspect 5, the weight portion 33 serves as a volume-changeable portion configured to change its volume to change the buoyancy of the buoyancy adjustment target object. The volume-changeable portion is configured to change the volume between a first volume in which a height position of the first portion relative to the second portion is raised by the buoyancy of the weight portion when the orientation adjustment target object floats in a fluid or sinks to/lands on the bottom of the fluid and a second volume in which the height position is lowered by the buoyancy of the weight portion.

This configuration adjusts the buoyancy of the weight portion 33 without changing the arrangement of the weight portion 33 to adjust the orientation of the orientation adjustment target object. This allows the adjustment of the orientation of the orientation adjustment target object, with the orientation adjuster attached onto the orientation adjustment target object. In this case, the orientation adjuster may be detachably attached onto the orientation adjustment target object.

Aspect 7

According to Aspect 7, in the orientation adjuster of any one of Aspect 1 to Aspect 6, the first portion of the orientation adjustment target object includes a housing portion 10 containing an object.

This configuration allows the adjustment of an orientation adjustment target object that contains a housing portion containing an object. This allows ease of user's handling of the orientation adjustment target object containing the housing portion in fluid and increases the convenience of the user for adjusting the orientation of the orientation adjustment target object.

Aspect 8

According to Aspect 8, in the orientation adjuster of Aspect 7, the object contained is an image-capturing device.

This configuration improves the handling and convenience of the underwater housing 1 during capturing of images in fluid by using the image-capturing device.

Aspect 9

According to Aspect 9, in the orientation adjuster of Aspect 8, the prescribed position is in a vicinity of a lens of the image-capturing device.

This configuration easily achieves an orientation adjuster of good handleability.

Aspect 10

According to Aspect 10, in the orientation adjuster of Aspect 8 or 9, the prescribed position is outside the image-capturing range of the image-capturing device.

This configuration prevents the orientation adjuster from being reflected in a captured image.

Aspect 11

According to Aspect 11, an orientation adjustment system 1000 includes: the orientation adjuster 30 according to any one of Aspect 1 to Aspect 10 configured to adjust orientation of the orientation adjustment target object (e.g., the underwater housing 1); and the buoyancy adjuster 20 attached onto a buoyancy adjustment target object (e.g., a housing portion 10) and configured to adjust buoyancy or buoyancy balance of the buoyancy adjustment target object in the fluid. The orientation adjustment target object includes the buoyancy adjustment target object and the buoyancy adjuster (20).

This configuration achieves an orientation adjustment system that adjusts the orientation of the orientation adjustment target object to lower the height position of the first portion relative to the second portion.

Aspect 12

According to Aspect 12, in the orientation adjustment system according to Aspect 11, the prescribed position of the weight portion is changeable between a first location and the second location. Further, when the prescribed position is changed to the first location, the weight portion 33 has the first buoyancy to raise a height position of the first portion relative to the second portion in the orientation adjustment target object floating in the fluid or landed on the bottom of the fluid. When the prescribed position is changed to the second location, the weight portion 33 has the second buoyancy to lower the height position of the first portion relative to the second portion in the orientation adjustment target object floating in the fluid or landed on the bottom of the fluid.

This configuration changes the arrangement of the weight portion and allows the adjustment of the orientation of the orientation adjustment target object.

Aspect 13

According to Aspect 13, in the orientation adjustment system of Aspect 11 or 12, the buoyancy adjustment target object includes a housing portion containing an object.

This configuration allows orientation adjustment system including the housing portion 10 to adjust the orientation of the orientation adjustment target object to lower the height position of the first portion relative to the second portion.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Aspect 14

According to Aspect 14, a buoyancy adjuster (20) includes: a buoyant portion (20) detachably attached to a target object (1) including a housing portion (10) having a positive buoyancy, the buoyant portion (20) having a neutral or negative buoyancy; and an orientation adjuster (30) detachably attachable to the buoyant portion (20), the orientation adjuster (30) configured to adjust orientation of the target object (1) in a fluid. The orientation adjuster (30) includes a weight portion (31) detachably attached to a prescribed position of the buoyant portion (20), the weight portion (31) having a negative buoyancy exceeding the positive buoyancy of the housing portion (10). A first height position of the housing portion (10) relative to a second height position of the buoyant portion (20) attaching the weight portion (31) is lower than the first height position relative to the second height position of the buoyant portion without the weight portion (31) in the fluid.

Aspect 15

According to Aspect 15, in the buoyancy adjuster (20) of Aspect 14, the orientation adjuster (30) further includes an attachment portion 32 or 31*a* detachably attachable at an attachment position (e.g., the snap-fit receiving portion 27 and a screw hole 28) of the target object. The weight portion (31) is detachably attached to the attachment portion.

Aspect 16

According to Aspect 16, in the buoyancy adjuster of Aspect 15, the attachment portion 32 includes an extension portion 32*b* extending from the attachment position to the prescribed position. The extension portion 32*b* has a lower density than that of the weight portion 31.

Aspect 17

According to Aspect 17, in the buoyancy adjuster of Aspect 16, the weight portion is made of metal, and the extension portion is made of resin.

Aspect 18

According to Aspect 18, in the buoyancy adjuster of any one of Aspect 15 to Aspect 17, the attachment portion (31*a*) attaching the weight portion (31) is detachably attached at another attachment position of the target object (e.g., a screw hole disposed at the lower portion of the buoyancy adjuster 20) different from the attachment position. The attachment portion (31*a*) attached at said another attachment position increases the negative buoyance of the buoyant portion.

Aspect 19

According to Aspect 19, in the buoyancy adjuster of any one of Aspect 14 to Aspect 18, the weight portion (33) includes a volume-changeable portion (33A, 33B), a volume of which is changeable between a first volume and a second volume smaller than the first volume. The first height position relative to the second height position with the weight portion (33) having the first volume is higher than the first height position relative to the second height position with the weight portion (33) having the second volume.

Aspect 20

According to Aspect 20, in the buoyancy adjuster (20) of any one of Aspect 14 to Aspect 19, the housing portion (10) accommodates an object (100).

Aspect 21

According to Aspect 21, in the buoyancy adjuster of Aspect 20, wherein the object (100) includes an image-capturing device including a lens.

Aspect 22

According to Aspect 22, in the buoyancy adjuster of Aspect 21, the prescribed position is in a vicinity of the lens of the image-capturing device.

Aspect 23

According to Aspect 23, in the buoyancy adjuster of Aspect 21 or 22, the prescribed position is outside an image-capturing range of the image-capturing device.

Aspect 24

According to Aspect 24, An orientation adjustment system (1000) includes: the buoyancy adjuster (20) according to Aspect 14; and a buoyancy adjustment target object (10) detachably attached to the buoyancy adjuster.

Aspect 25

According to Aspect 25, in the orientation adjustment system (1000) of Aspect 24, the orientation adjuster (30) further includes an attachment portion (32; 31*a*) detachably attachable at an attachment position (27; 28) of the target object (1). The weight portion (31) is detachably attached to the attachment portion. The attachment portion (32) includes an extension portion (32*b*) extending from the attachment position to the prescribed position. The extension portion (32*b*) has a lower density than a density of the weight portion (31). The first height position relative to the second height position with the extension portion (32*b*) at the prescribed position is lower than the first height position relative to the second height position with the extension portion (32*b*) at the attachment position.

Aspect 26

According to Aspect 26, in the orientation adjustment system (1000) of Aspect 24 or 25, the target object (10) includes a housing portion accommodating an object.

The invention claimed is:

1. A buoyancy adjuster for use in a system including the buoyancy adjuster and a target object, the buoyancy adjuster comprising:
   a buoyant portion detachably attachable to the target object including a housing portion having a positive buoyancy, the buoyant portion having a neutral or negative buoyancy; and
   a weight which is detachably attached to a prescribed position of the system,
   wherein:
   the weight has a negative buoyancy exceeding the positive buoyancy of the housing portion, and
   attachment of the weight to the system at the prescribed position causes the target object to assume a first orientation in a fluid, and without the weight attached to the buoyant portion, the target object assumes a second orientation in the fluid, the housing portion in the first orientation being at a lower vertical position compared to the buoyant portion than in the second orientation.

2. The buoyancy adjuster according to claim 1, further comprising:
   an attachment structure to detachably attach the weight to the prescribed position of the system.

3. The buoyancy adjuster according to claim 2, wherein;
   the attachment structure includes an extension portion extending from the attachment position to the prescribed position, and
   the extension portion has a lower density than a density of the weight.

4. The buoyancy adjuster according to claim 3, wherein;
   the weight is made of metal, and
   the extension portion is made of resin.

5. The buoyancy adjuster according to claim 2, wherein;
   the attachment structure is for detachably attaching the weight to the target object, and
   the weight attached to the object using the attachment structure increases the negative buoyancy of the buoyant portion.

6. The buoyancy adjuster according to claim 1, wherein;
   the weight includes a volume-changeable portion, a volume of which is changeable between a first volume and a second volume smaller than the first volume,
   an orientation of the target object with the weight having the first volume is higher than an orientation of the target object with the weight having the second volume.

7. The buoyancy adjuster according to claim 1, wherein;
   the housing portion accommodates an object.

8. The buoyancy adjuster according to claim 7, wherein;
   the object includes an image-capturing device including a lens.

9. The buoyancy adjuster according to claim 8, wherein;
   the prescribed position is in a vicinity of the lens of the image-capturing device.

10. The buoyancy adjuster according to claim 8, wherein;
    the prescribed position is outside an image-capturing range of the image-capturing device.

11. An orientation adjustment system corresponding to the system of claim 1, comprising:
    the buoyancy adjuster according to claim 1; and
    the target object detachably attached to the buoyancy adjuster.

12. The orientation adjustment system according to claim 11, further comprising:
    an attachment structure detachably attachable at an attachment position of the target object,
    wherein:
    the weight is detachably attached to the attachment portion,
    the attachment portion includes an extension portion extending from the attachment position to the prescribed position,
    the extension portion has a lower density than a density of the weight.

13. The buoyancy adjuster according to claim 1, further comprising:
    an attachment structure to detachably attach the weight to the prescribed position of the buoyancy adjuster.

* * * * *